Aug. 22, 1939.   M. A. EDWARDS ET AL   2,170,450
ILLUMINATING CIRCUITS
Filed May 28, 1938
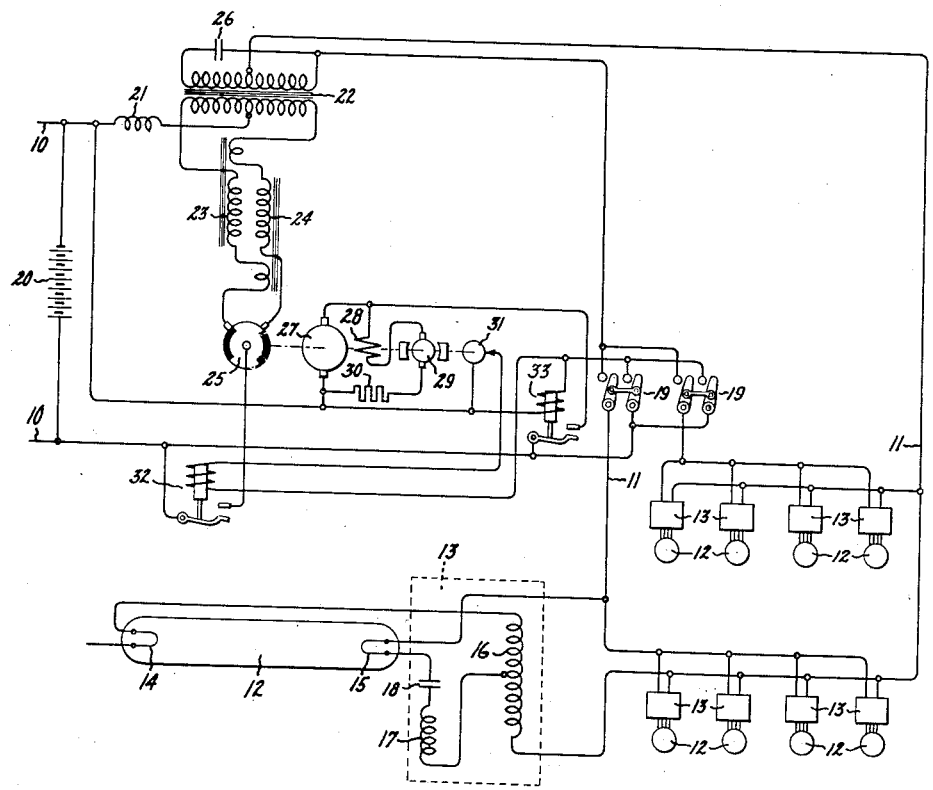
Inventors:
Martin A. Edwards,
Burnice D. Bedford,
by Harry E. Dunham
Their Attorney.

Patented Aug. 22, 1939

2,170,450

UNITED STATES PATENT OFFICE 2,170,450

ILLUMINATING CIRCUITS

Martin A. Edwards and Burnice D. Bedford, Schenectady, N. Y., assignors to General Electric Company, a corporation of New York Application May 28, 1938, Serial No. 210,715

7 Claims. (Cl. 171—97)

Our invention relates to illuminating circuits, and more particularly to control systems for such circuits.

It has been found desirable to utilize electric discharge illuminating devices which require an alternating current applied thereto in installations having only a direct current supply. In such instances the direct current obtained from the supply circuit may be changed into alternating current by an inverter apparatus including a rotary distributor or circuit interrupter driven by a direct current motor. It is desirable to provide a control circuit so that the converter will begin operating as soon as any of the illuminating devices are switched onto the alternating current circuit and that the inverter stop operation without damage to any of the apparatus whenever all of the illuminating devices have been switched off or disconnected from the alternating current circuit.

One object of our invention is to provide an improved illuminating system utilizing electric discharge devices and which is operated from a direct current source.

Another object of our invention is to provide an improved control circuit for illuminating electric discharge devices energized by converting apparatus.

The novel features which we believe to be characteristic of our invention are set forth with particularity in the appended claims. Our invention itself, however, both as to its organization and method of operation, together with further objects and advantages thereof, will be better understood by reference to the following description taken in connection with the accompanying drawing in which the single figure of the drawing is a diagrammatic representation of an illuminating system which embodies our invention.

Referring now to the drawing, we have illustrated a direct current supply circuit 10 and an alternating current supply circuit 11 which has a load comprising a plurality of circuits having connected thereto a plurality of electric discharge illuminating devices 12 provided with individual starting and operating circuits 13. A preferred form of the electric discharge device 12 is a lamp of a positive column type comprising a tubular envelope having electrodes at its ends and containing a gaseous atmosphere such as a rare gas, for example argon, and a small quantity of vaporizable metal, such as mercury. Preferably the envelope is coated internally with a suitable fluorescent material in order that the electric discharge, which in itself may be scarcely visible, shall produce the desired high degree of illumination. Such an electric discharge device 12 having at its ends electrodes 14 and 15 one of which may be thermionic, may require a starting voltage considerably higher than the operating voltage, and this is supplied by the circuit 13. The circuit 13 includes a ballast reactor or choke coil 16, one terminal of which is connected to one side of the alternating current circuit 11 and the other terminal of which is connected to one of the electrodes 14 of the discharge lamp 12. At a point intermediate the ends of this reactor is a tap connection which is connected through a reactor 17, a capacitor 18, and the thermionic cathode 15 of the lamp 12 to the other side of the alternating current circuit 11. The reactor 16 operates during the starting operation as a step-up autotransformer to supply a high voltage between the electrodes 14 and 15 of the lamp device 12. The reactor 17 and the capacitor 18 provide leading power factor energy since they constitute a circuit which is in a condition of partial resonance and the voltage applied to the two electrodes is equal to the vector sum of that of the source and the induced voltage of the reactor 16 due to the leading current drawn through the branch circuit comprising the reactor 17 and capacitor 18. After the lamp has started it continues to operate with the reactor 16 in combination with the reactor 17 and capacitor 18 as the effective ballast. Each of the branch circuits comprising a plurality of lamps 12 is controlled by a double pole switch, one pole of which completes the connection to the alternating current circuit 11 and the other pole of which is a portion of a control circuit the purpose of which will subsequently become apparent. The arrangement for providing high starting voltages and lower operating voltages to the electric discharge device 12 is described and broadly claimed in a copending application of Martin A. Edwards, filed March 22, 1938, Serial No. 197,529, for Electric discharge apparatus, and assigned to the same assignee as the present application.

The direct current circuit 10 may be energized from a storage battery 20 or in the instance of railway trains, the storage battery energy may be augmented by the axle generator. Power from this source is transmitted to a smoothing reactor 21 to the midpoint of the primary winding of a transformer 22, the output of which supplies alternating current to the illuminating circuit 11. The outer extremities of the primary winding of the transformer 22 are each connected through one of a pair of saturable reactors 23 and 24 to a rotary distributor or interrupting device 25. The secondary winding of the transformer 22 is provided with a capacitor 26 which supplies the necessary commutating voltage for this apparatus which constitutes an inverter of the electromechanical type. The distributor 25 of the inverter is driven by a direct current motor having an armature 27 and a field winding 28 which is connected in shunt to the armature through a regulating generator 29 and a resistor 30. The regulating generator 29 comprises an armature and permanent magnet pole pieces arranged so that the voltage produced thereby is in opposition to the normal field excitation of the main motor. The function of the regulator 29 is to maintain a relatively constant speed of the main motor even though the direct current supplied by the axle generator or the storage battery 20 may vary. On the same shaft with the distributor, the motor and the regulator, there is arranged a centrifugal switch 31 which controls the operation of a relay 32 which serves to delay the energization of the inverter apparatus until the motor has attained normal operating speed. The motor comprising the armature 27 and field 28 is energized by a relay 33 which is controlled by the right-hand switch contacts of each of the lighting control switches 19.

If it is desired to turn on any of the lamps 12, one of the switches 19 is closed which completes the circuit from the lamps to the output transformer 22 of the inverter and also completes the circuit through operating coil of the relay 33. The field circuit of the motor 27 includes a regulating device 29 and a resistor 30 which has a negative temperature coefficient. The regulator 29 compensates for the variations in voltage of the supply circuit and the negative temperature characteristic resistor 30 compensates for the increase in field resistance after the motor has been operating sufficiently long to attain its normal operating temperature. The relay 33 thus being actuated completes a circuit through the field and armature of the motor which drives the rotary distributor or circuit interrupter 25. After the motor has reached its normal operating speed, the centrifugal switch 31 completes a circuit through operating coil of the relay 32 which then closes the circuit through the distributor 25 thereby causing the inverter to become operative. For the purposes of simplicity, the distributor 25 has been shown in its simplest form and includes two insulating segments so that at any one time only one of the brushes is in contact therewith thereby causing direct current to be transmitted from the direct current circuit 10 through the smoothing reactor 21 and one-half of the primary winding of the transformer 22 through one of the saturable reactors such as 24, the distributor 25, the contacts of the relay 32, to the other side of the direct current circuit 10. The function of the saturable reactors 23 and 24 is described in detail in a copending application of Burnice D. Bedford, Serial No. 113,581, filed December 1, 1936, for Electric circuits, and which is assigned to the same assignee as the present invention, and in which the feature of providing a saturable reactor arranged to increase the inductance of the inverter circuit at the end of the normal conducting interval sufficiently to control the rate of the change of current through the distributor means is broadly claimed and disclosed. The saturable reactors 23 and 24 are designed to become saturated at the normal current transmitted through the two parallel paths including these reactors. Reduction in the current through the saturable reactor 23 desaturates the reactor 24 and causes thereby a substantial increase in the inductance of this element. Due to this the current through the saturable reactor 24 will be decreased to a relatively small value at the end of the conducting period of the brush associated with this reactor so that the brush of the distributor mechanism 25 will be required to interrupt only a relatively small portion of the current which has been previously transmitted to the distributor. It has, furthermore, been found that the operation of this device is greatly improved if the brushes for the distributor 25 are selected with relatively low resistance characteristics so that the brushes do not materially influence the voltage conditions of the remaining elements of the inverter circuit. The commutating capacitor 26 alternately charges and discharges through the secondary winding of the transformer 22 so that the current is readily transferred from one brush to the other and this function is quite similar to the usual function of a commutating capacitor. The motor 27 will continue to cause the inverting apparatus to supply alternating current to the circuit 11 as long as any of the branch circuits which are controlled by the switches 19 are connected to require energy to be transmitted thereto. Whenever all of the switches 19 are open the circuits through both of the operating coils of the relays 32 and 33 are interrupted so that both relays drop out simultaneously thereby de-energizing the inverter apparatus and the motor. The energy stored in the motor will be dissipated through its field circuit which includes the regulator 29 and the current limiting resistor 30.

The control circuit, therefore, operates during the starting operation to protect the inverter by preventing large direct currents from flowing through the distributor 25 which would occur if the distributor were not rotating at its normal operating speed. The control circuit, furthermore, protects the apparatus by deenergizing the driving motor and at the same time removing the direct current potential from the inverter whenever there is no further demand for alternating current so that any inertia stored in the motor would not tend to continue to permit current to flow through the distributor 25 at speeds less than its normal operating speed.

While we have shown and described our invention in connection with a certain specific embodiment, it will, of course, be understood that we do not wish to be limited thereto, since it is apparent that the principles herein disclosed are susceptible of numerous other applications and modifications may be made to the circuit arrangement without departing from the spirit and scope of our invention as set forth in the appended claims.

What we claim as new and desire to secure by Letters Patent of the United States, is:

1. The combination comprising a source of direct current, an alternating current load circuit, an inverter apparatus interconnecting said circuits and including an interrupter, driving means arranged to be energized from said direct current circuit for driving said interrupter, a control circuit for said driving means and said inverter including means controlling the circuit relationship of said alternating current circuit with said interrupter and a direct current control circuit including means for controlling the supply of energy to said driving means, and means responsive to a predetermined condition of said driving means for controlling the supply of energy to said interrupter.

2. The combination comprising a source of direct current, an alternating current load circuit, an inverter apparatus interconnecting said circuits, said apparatus including a rotary interrupter, a motor for driving said interrupter, a control circuit for said interrupter and said motor comprising means responsive to a demand for power by said alternating current load to energize said motor, and means responsive to a predetermined speed of said motor for energizing said interrupter and said inverter apparatus.

3. The combination comprising a source of direct current, an alternating current load circuit, an inverter apparatus including a rotary interrupter, a plurality of saturable reactors connected in series with said interrupter for increasing the inductance of said inverting apparatus at the end of each conducting interval of said interrupter, means for supplying a commutating potential to said inverter apparatus, a motor arranged for driving said interrupter, a control circuit for said motor and inverter apparatus including switching means for simultaneously connecting said alternating current load to the output circuit of said inverter apparatus and for causing energy to be supplied to said motor, and means responsive to a predetermined speed of said motor for supplying energy to said inverter apparatus.

4. The combination comprising a direct current supply circuit, an alternating current load circuit, an inverter apparatus interconnecting said circuits and comprising a plurality of inductive windings and a rotary distributor for controlling the flow of energy through said inductive windings, a motor for driving said distributor, control means for said motor responsive to variations in the voltage of said supply circuit for maintaining a relatively constant speed of said motor, and means responsive to a predetermined speed of said motor for controlling the flow of energy through said inverter apparatus.

5. The combination comprising a source of direct current, an alternating current load circuit, an inverter apparatus interconnecting said circuits, said apparatus comprising a plurality of inductive windings and a rotary distributing means, inductance means connected in series relation with said windings and said rotary distributor, said last mentioned means having a relatively small inductance at the beginning of the conducting intervals of said distributing means and arranged to effect a substantial increase in the inductance at the end of the conducting intervals to control the rate of change of current through said distributing means, a motor for driving said distributor means, and a control circuit for controlling said inverting apparatus and said motor in accordance with the demand for energy by said alternating current load circuit, said control circuit including a plurality of switches each arranged to connect the load circuit to said inverting apparatus and simultaneously to energize relay means operating to control the flow of energy through said motor, a centrifugal switch mounted on the shaft of said motor arranged to close the circuit at a predetermined speed of said motor, said circuit being connected in series with said switches and including relay means operating to control the flow of energy through said inverter apparatus.

6. The combination comprising a source of direct current and a plurality of alternating current load circuits, an inverter means arranged to interconnect said circuits, said inverter comprising a plurality of inductive windings, a rotary distributor and a plurality of saturable reactors connected in series relation with one of said inductive windings and said distributor and arranged to be energized from said direct current, said saturable reactors operating to decrease the rate of change of current through said distributor means at the end of the conducting intervals and during the circuit interrupting operation, a direct current motor for driving said distributor and a control circuit for controlling said inverter and said motor in accordance with the demand for energy by said load circuits, said control circuit including a plurality of switches, said switches being arranged to complete the circuit from said load devices to said inverter apparatus and simultaneously complete a circuit through an auxiliary control circuit, said control circuit including a relay operating to control the energization of said motor, and a relay for controlling the energization of said inverter apparatus, means connected in series with said latter relay for controlling the operation thereof in response to a predetermined speed of said motor, and means for maintaining the speed of said motor relatively constant.

7. The combination comprising a direct current supply circuit, a plurality of alternating current load circuits, an inverter apparatus arranged to interconnect said circuits, said inverter apparatus including a rotary circuit interrupter means, a motor for driving said interrupter means, and a control circuit responsive to the connection of any of said load circuits to said inverter apparatus for energizing said motor and subsequently energizing said inverter apparatus, said control circuit being responsive to the disconnection of all of said load circuits simultaneously to de-energize said motor and said inverter apparatus.

MARTIN A. EDWARDS.
BURNICE D. BEDFORD.